United States Patent [19]

Kotera et al.

[11] Patent Number: 5,377,351
[45] Date of Patent: Dec. 27, 1994

[54] DEVICE FOR CONTROLLING MULTIPLE TRANSACTIONS CONTENDING CONCURRENTLY FOR THE SAME RESOURCE IN A DISTRIBUTED DATABASE SYSTEM

[75] Inventors: Makoto Kotera; Sadayuki Hikita, both of Tokyo, Japan

[73] Assignee: Oki Electric Industry Co., Ltd., Tokyo, Japan

[21] Appl. No.: 711,984

[22] Filed: Jun. 7, 1991

[30] Foreign Application Priority Data

Jun. 20, 1990 [JP] Japan .................................. 2-159685

[51] Int. Cl.5 ..................... G06F 12/00; G06F 15/16
[52] U.S. Cl. .................................. 395/650; 364/281.5; 364/281.6
[58] Field of Search ............................. 355/650

[56] References Cited

U.S. PATENT DOCUMENTS

| | | | |
|---|---|---|---|
| 4,189,771 | 2/1980 | Roever | 395/650 |
| 4,494,193 | 1/1985 | Brahm et al. | 395/200 |
| 4,574,350 | 3/1986 | Starr . | |
| 4,747,130 | 5/1988 | Ho . | |
| 4,791,554 | 12/1988 | Hirohita et al. . | |
| 4,937,733 | 6/1990 | Gillette et al. . | |
| 5,175,852 | 12/1992 | Johnson et al. | 395/600 |

FOREIGN PATENT DOCUMENTS 60-75939   3/1985  Japan .............................. G06F 9/46
60-247746 12/1985  Japan .............................. G06F 9/46

OTHER PUBLICATIONS

Knapp, "Deadlock Detection in Distributed Databases", ACM Computing Surveys, vol. 19, No. 4, Dec. 1987, pp. 303-315.

*Primary Examiner*—Gareth D. Shaw
*Assistant Examiner*—John Q. Chavis
*Attorney, Agent, or Firm*—Spencer, Frank & Schneider

[57] ABSTRACT

A database processor in a distributed database system has a decision making section for use in detecting whether a distributed deadlock has occurred if a contention is detected by a contention detector. If a distributed deadlock occurs, the decision making section posts or provides a concurrency controller with information regarding the detection of the distributed deadlock, whose occurrence has been detected by a global deadlock detector on a network to which the database processor is connected. The concurrency controller instructs a transaction controller to cancel the queuing of the transaction forming the distributed deadlock. The transaction controller can then take prescribed controlling actions to swiftly resolve the distributed deadlock.

5 Claims, 3 Drawing Sheets

DEVICE FOR CONTROLLING MULTIPLE TRANSACTIONS CONTENDING CONCURRENTLY FOR THE SAME RESOURCE IN A DISTRIBUTED DATABASE SYSTEM

BACKGROUND OF THE INVENTION

1. Field of the Invention

The present invention relates to a contention control processor for a database system, and in particular, to a contention control processor that delays the execution of a transaction that has requested access to a resource until the execution of a transaction that requested access to the resource earlier is completed, when a contention occurs where multiple transactions concurrently request access to the same resource in a database.

2. Description of the Prior Art

A database system is provided with files forming a database and a means for retrieving these files. A transaction is generated for each processing unit, as an access procedure, whereby each resource in the database is accessed. Such a database system is provided with a processor for performing contention control wherein, if a contention occurs where multiple transactions concurrently request access to the same resource, one transaction is preferentially executed ahead of the others, queuing the others.

One conventional type of contention control processor operates in such a manner that the processing of a transaction that issues an access request later is delayed until the processing of a transaction that issued an access request earlier has been executed. This type of contention control processor is provided with a concurrency controller for detecting the occurrence of a contention among transactions or the resolution of a contention, a transaction controller for controlling the queuing of the transaction that issued an access request later or the canceling of its queuing, and a deadlock controller for detecting the occurrence of a deadlock caused by contention among the transactions within the same system.

In such a contention control processor, the following processes are conducted when a resource T2 requests access to a resource that is already occupied by another transaction. First, the concurrency controller that received the access request of transaction T2 detects the occurrence of a contention, and posts the transaction controller with this information. The transaction controller, being posted with the information, queues (delays) the execution of transaction T2. Next, the concurrency controller simultaneously detects the completion of the execution of transaction T1 and the resolution of the contention over the resource, and posts the transaction controller with information regarding the resolution, whereby the transaction controller cancels the queuing of transaction T2 so that the execution of transaction T2 can begin.

However, if contention control is performed in a manner so as to queue the execution of such transactions, the system may be led into a so-called deadlock situation. A deadlock situation occurs, for example, when transaction T2 is waiting for the completion of transaction T1 after requesting an access to the resource occupied by transaction T1, and transaction T1 tries to use the resource occupied by transaction T2. T1 contends with transaction T2 for the same resource, having its own execution delayed, and as a result, both transactions T1 and T2 are queued, being suspended in the condition that the execution of both transactions is delayed. The occurrence of such a deadlock is detected by the deadlock controller, which obtains information regarding the contention from the concurrency controller. When a deadlock is detected, the deadlock controller tries to resolve the deadlock by freeing the resource from the access request of one of transactions, so that the other transaction can be preferentially executed.

Incidentally, this type of processor has been applied to so-called centralized database systems. The contention control processor described above detects contention, the resolution of the contention or the occurrence of a deadlock only within its own system, and the countermeasure processing is also completed within its own system. However, recently, in order to retrieve a wider range of information, research has been performed on distributed database processing systems wherein multiple database systems are interconnected by means of a network, for example, a local area network or a global area network, so that the multiple database systems can be operated like a single database system.

However, in a distributed database processing system, the contention control processor described above is unable to handle the situation where a so-called distributed deadlock has occurred. A distributed deadlock occurs when transactions generated from the separate database processors in a distributed database processing system form a contention simultaneously involving the separate processors, and as a result, the separate database processors are effectively locked to each other.

SUMMARY OF THE INVENTION

It is therefore the object of the present invention to provide a database processor suitable for the construction of a distributed database processing system, in other words, to provide a contention control processor capable of effectively handling a situation where a distributed deadlock has occurred.

In accordance with the present invention, there is provided a processor for controlling a contention among the multiple transactions in a distributed database system, comprising a contention detecting means for detecting the occurrence or the resolution of a contention among the transactions within its own database system; a transaction controlling means for posting the contention detecting means with the contention information regarding the resources to be accessed by the transactions and the state of the execution of the transactions, queuing the transaction that requested an access later in the contention situation until the execution of the transaction that requested an access earlier has been completed if the contention is detected by the contention detecting means, and canceling the queuing of the transaction having been queued if the resolution of contention is detected by the contention detecting means; a deadlock controlling means for detecting whether a deadlock has occurred within its own database system if a contention is detected by the contention detecting means, and for taking controlling actions for resolving the deadlock if a deadlock has occurred; and a decision making means for deciding whether the deadlock has occurred between its own database system and another database system if a contention is detected by the contention detecting means.

BRIEF DESCRIPTION OF THE DRAWINGS

The objects and features of the present invention will become more apparent from the consideration of the following detailed description, taken in conjunction with the accompanying drawings in which.

DESCRIPTION OF THE PREFERRED EMBODIMENT

Figure 2:
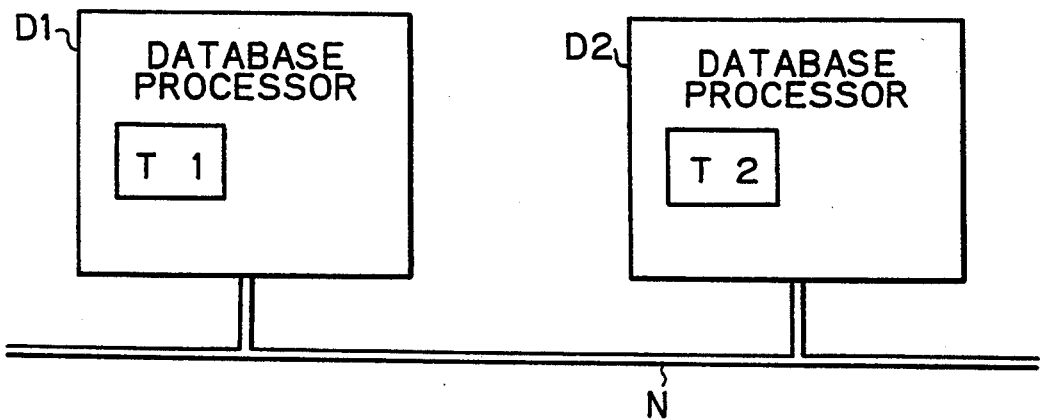
FIG. 2 is a block diagram showing a portion of the distributed database system for explaining a distributed deadlock.
Figure 3:
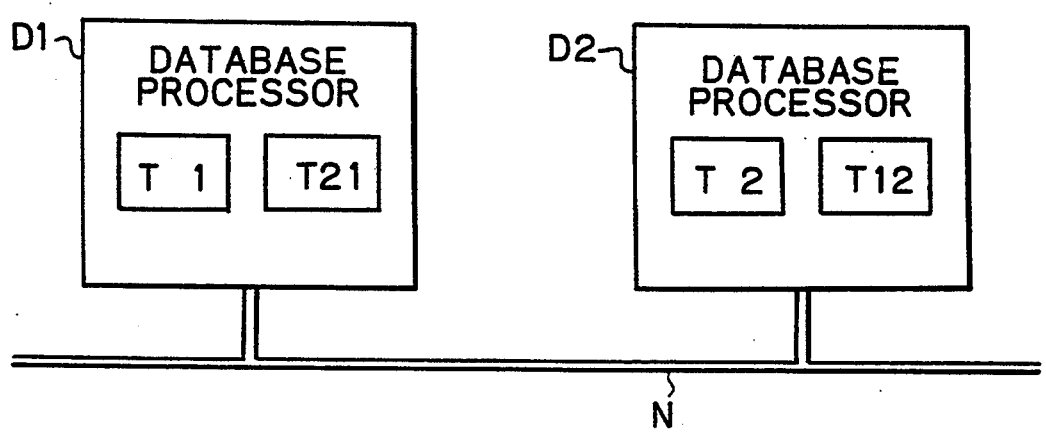
FIG. 3 is a block diagram for explaining the same distributed deadlock as the above.
Figure 4:
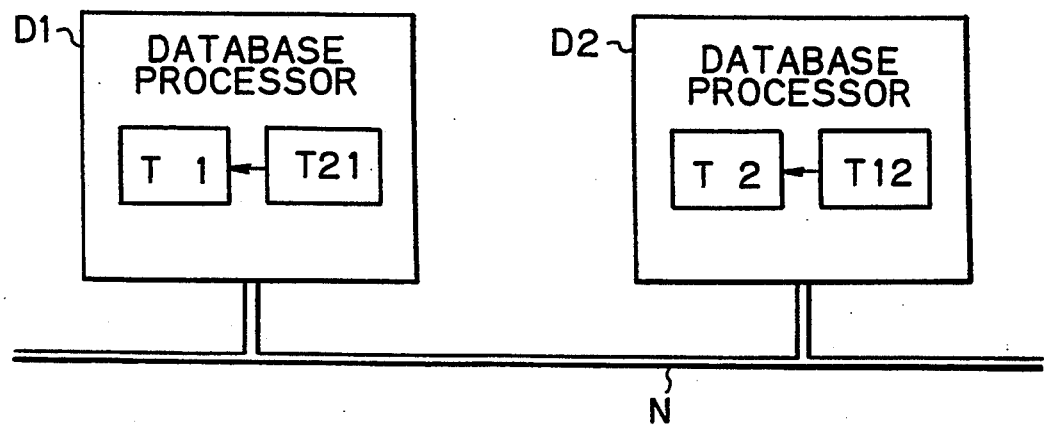
FIG. 4 is a block diagram for explaining the same distributed deadlock as the above.

First, in order to simplify the following explanation of an embodiment of the contention control processor in accordance with the present invention, an occurrence ox a distributed deadlock will be explained, referring to the explanatory diagram of a distributed database system shown in FIGS. 2, 3 and 4. In these diagrams, each of first and the second database processors D1 and D2 is provided with files forming a database and a means for retrieving these files. First and second databases D1 and D2 are connected with a network N. In FIG. 2, it is assumed that a transaction T1 is generated in first database processor D1 and a transaction T2 is generated in second database processor D2. These transactions T1 and T2 have been generated within their own database processors D1 and D2, respectively, and are called parent transactions. When parent transaction T1 requires a resource in database processor D2 and parent transaction T2 requires a resource in database processor D1, parent transaction T1 tries to conduct the processing of the required resource by means of generating a child transaction T12 on database processor D2, and parent transaction T2 tries to conduct the processing of the required resource by means of generating a child transaction T21 on database processor D1, as is shown in FIG. 3. As a result, as is shown in FIG. 4, a contention occurs wherein the execution of transaction T21 is delayed (queued) on the side of database processor D1 until parent transaction T1 releases the resource, and on the other hand, the execution of transaction T12 is delayed on the side of database processor D2 until parent transaction T2 releases the resource. As the result of such a contention, a distributed deadlock occurs wherein both separate database processors D1 and D2 are delayed from processing their own transactions.

Figure 1:
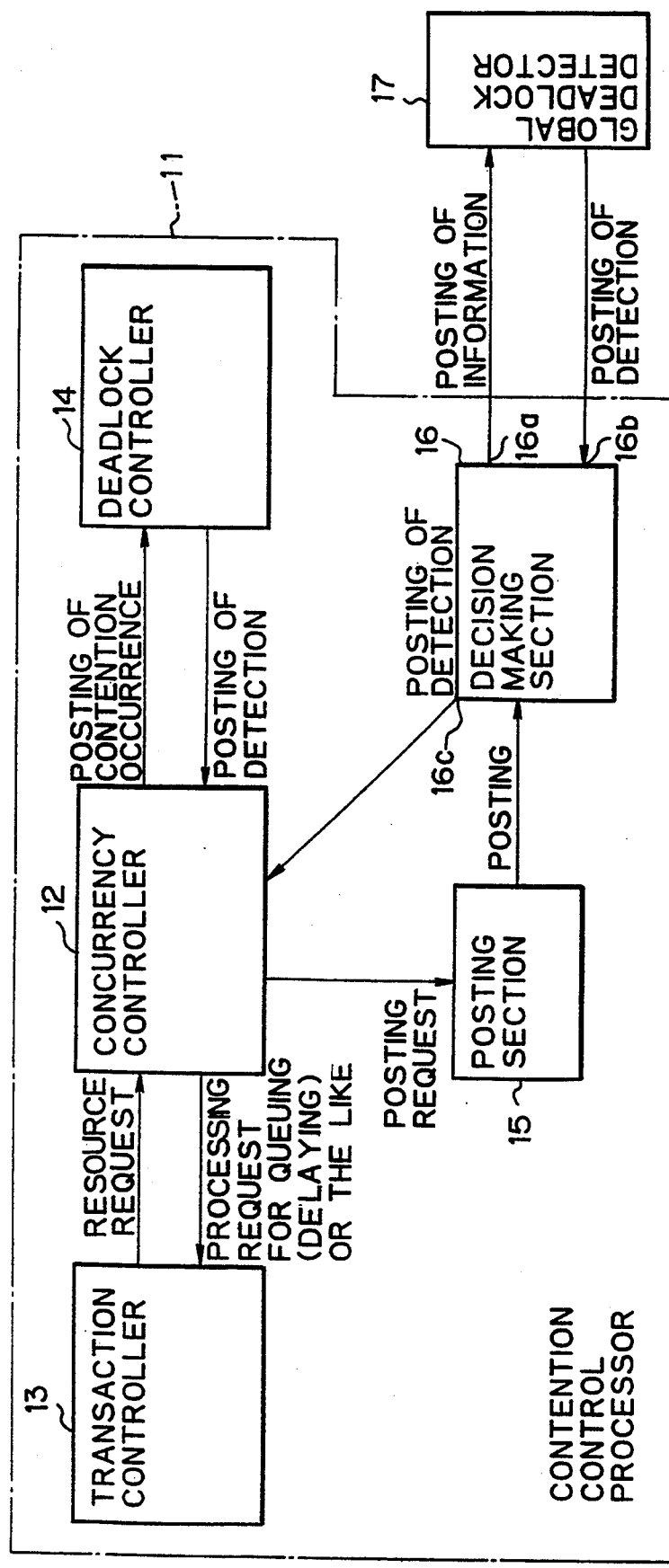
FIG. 1 is an illustrative block diagram showing an embodiment in accordance with the present invention for executing contention control.

According to this embodiment, contention control processors (11) shown in FIG. 1 are provided in database processors D1 and D2, respectively, in order to effectively resolve such a distributed deadlock. One of the characteristics of this embodiment is that a transaction ID, or individual identification information, is given to the transactions generated in their respective database processors. This transaction ID is provided with source identification information indicating the source database processor, and parentage identification information indicating the parentage among transactions, whereby it becomes possible to identify the transaction sources or the parentage among transactions. Further, when a distributed database system is constructed using database processors containing contention control processors 11, the system is also provided with a global deadlock detector 17 for detecting a distributed deadlock, as is shown in FIG. 1, based on the information obtained from the respective contention control processors 11, which is another characteristic of this embodiment.

Contention control processor 11 of this embodiment is shown in FIG. 1 and will be explained in detail under conditions such as were presented above. This contention control processor 11 is provided with a concurrency controller 12, a transaction controller 13, a deadlock controller 14, a posting section 15 and a decision making section 16. Concurrency controller 12 constitutes a contention detection means for detecting the occurrence or resolution of a contention among transactions within its own database processor. When this concurrency controller 12 detects the occurrence or resolution of a contention within its own database processor, and receives information from decision making section 16 which will be explained later, it sends an instruction for queuing the latest transaction or cancelling the queuing to transaction controller 13. Also, when this concurrency controller 12 detects the occurrence or the resolution of a contention among transactions within its own device, it transfers a transaction ID received from transaction controller 13, along with the information regarding the contention or its resolution, to posting section 15, which will be explained later.

Transaction controller 13 the function of controlling the queuing or canceling the queuing of the contending transaction that requested access later. This transaction controller 13 detects the transaction ID given to each transaction and posts or provides concurrency controller 12 with this transaction ID, along with the resource access request.

Deadlock controller 14 has the deadlock detection function of detecting the occurrence of a deadlock within its own system based on the information regarding the occurrence of the contention that has been posted by concurrency controller 12. When detecting the deadlock, this deadlock controller 14 posts concurrency controller 12 with the detection of the deadlock and also sends it a processing instruction to resolve the deadlock, for example, an instruction for prioritizing one of the transactions.

Posting section 15 has the function of posting decision making section 16 with the occurrence or the resolution of the contention by means of using the transaction ID transferred from concurrency controller 12. Specifically speaking, or provides posting section 15 posts the information in the form of "The execution of transaction Tn is delayed by transaction Tm" when a contention occurs, and posts the information in the form of "The execution delay of transaction Tn by transaction Tm is resolved" when the contention is resolved (is eliminated).

Decision making section 16 decides whether the transactions that triggered the contention are parent transactions generated within the very processor where decision making section 16 belongs, based on the information posted by posting section 15. Decision making section 16 is provided with a storage means for storing the posted information. The information posted from posting section 15 to decision making section 16 is stored in the storage means of decision making section 16 and is used to decide whether a distributed deadlock has occurred, and this information is subsequently renewed or updated by information regarding the occurrence or the resolution of contention, which is provided by posting section 15. Generally speaking, if both of the transactions that triggered a contention are parent transactions generated within the same processor, there is no possibility of a distributed deadlock, but if the transactions that triggered a contention consist of a combination of parent transactions generated within separate processors, there is the possibility of a distributed deadlock. Based on such information, decision making section 16 decides whether there is a possibility of a distributed deadlock. Specifically, decision making section 16 identifies the parent transactions based on the transaction IDs of the transactions that triggered the contention, compares the identified transactions to each other, and decides whether a distributed deadlock may have occurred based on the above mentioned information. Further, decision making section 16 is provided with an output section 16a outputting information such as the results of its own decision to global deadlock detector 17 on the network, an input section 16b for accepting information from global deadlock detector 17, and a detection information posting section 16c for posting concurrency controller 12 with the results of its decision when it has decided that a distributed deadlock has occurred.

Global deadlock detector 17 ;obtains the same kind of information from multiple contention control processors 11 and detects, from a global standpoint, the occurrence of a distributed deadlock in the distributed database system. Each of the decision making sections 16 in the respective contention control processors 11 is posted with the detection result of the global deadlock detector 17 through its own input section 16a. Concurrency controller 12 is posted with the detection information by detection information posting section 16c, and instructs transaction controller 13 to cancel queuing (delay) the relevant transaction. As a result, it becomes possible to resolve the contention and eliminate the distributed deadlock. In this embodiment, decision making section 16 decides whether there is a possibility of an occurrence of a distributed deadlock, based on whether the transactions that caused contention are parent transactions generated within the same processor. However, if both transactions Tm and Tn that caused a contention are transactions generated within the same processor but, for example, the transaction Tm delays the execution of a transaction in a separate database processor and the execution of the other transaction Tn is delayed by that very transaction in the separate database processor, it looks at first glance as if the contention is an internal one in the same single date base processor. However, in reality, a distributed deadlock is possible. In a case like this, the occurrence of a distributed deadlock can be detected through the global decision making process by global deadlock detector 17 even though decision making section 16 cannot immediately detect the occurrence of a distributed deadlock by itself.

Figure 5:
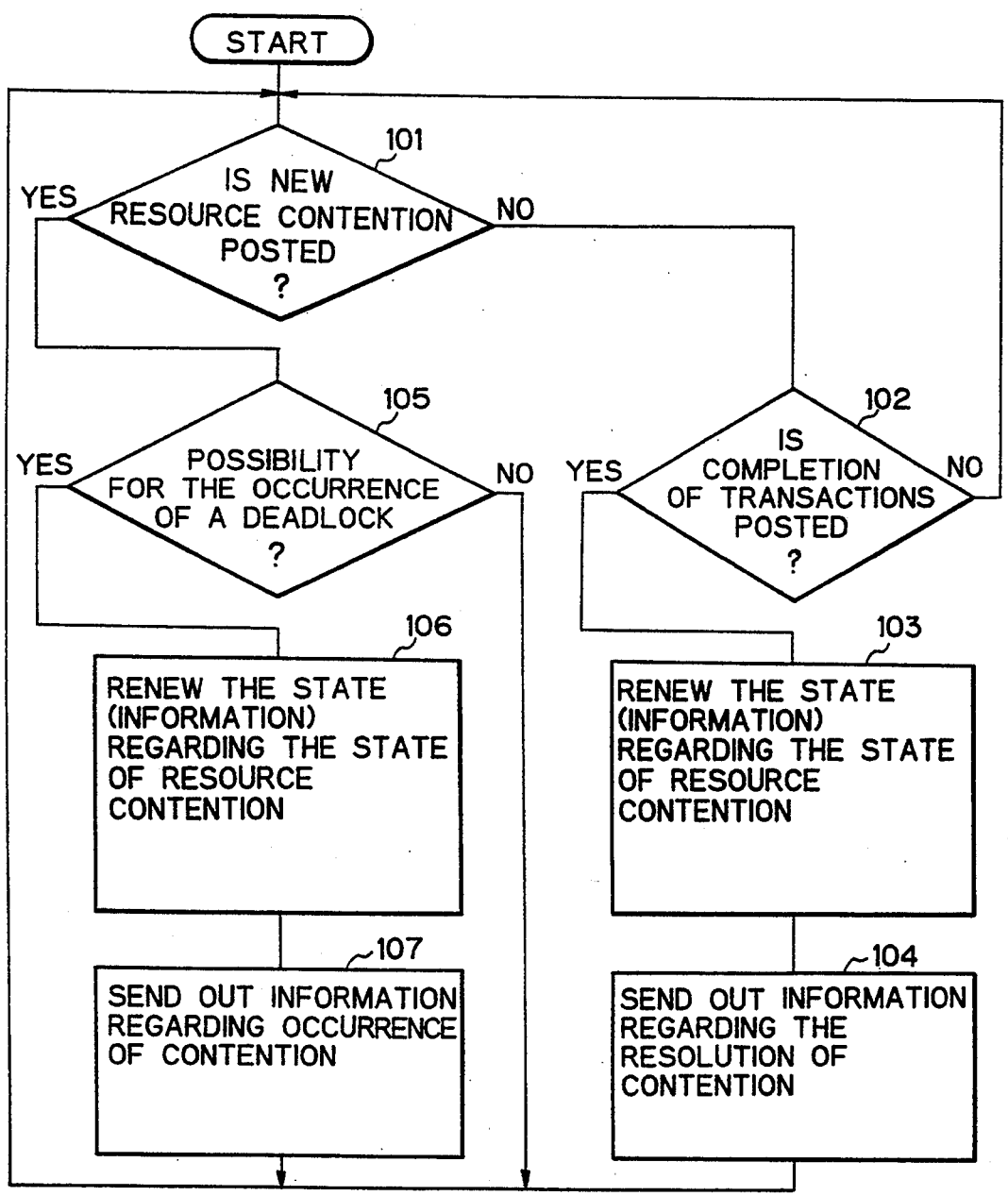
FIG. 5 is a flow chart showing the process in decision making section 16 of the processor in FIG. 1.

Next, the process for resolving a distributed deadlock in this embodiment will be explained based on the resolving process flow chart for decision making section 16 shown in FIG. 5. In this figure, decision making section 16 decides whether the information regarding the occurrence of a new resource contention is posted by posting section 15 (step 101). In this case, decision making section 16 is provided by posting section 15 with transaction IDs along with the contention information supplied from concurrency controller 12.

Decision making section 16 waits for the posting of the resolution of the contention if it has not been posted by posting section 15 with information regarding a new contention (step 102), to know the completion of the transaction, and returns to step 101 if it is not posted with information regarding the completion. If decision making section 16 is posted by posting section 15 with the information regarding the completion, it renews or updates the information, which is stored in the storage means, regarding the contention over resources, based on this information (step 103). Based on this information, decision making section 16 sends out the information regarding the resolution of the contention to global deadlock detector 17 from output section 16a (step 104) and returns to the first step 101.

On the other hand, if decision making section 16 is posted in step 101 by posting section 15 with information regarding a new resource contention, it decides whether the transactions that triggered the contention are transactions generated within the same processor, by means of identifying the transaction IDs posted by posting section 15 and based on the information stored in the storage means, to decide whether there is a possibility that of a distributed deadlock has occurred (step 105).

If there is no possibility of a distributed deadlock, it returns to step 101. If a distributed deadlock is possible, decision making section 16 renews or updates the information regarding the contention over resources (step 106). Further, decision making section 16 sends out the information regarding the occurrence of a contention to global deadlock detector 17 from output section 16a (step 107) and returns to step 101. Global deadlock detector 17 obtains similar information from other contention control processors 11 in separate database processors, and if it detects a distributed deadlock, it sends out an instruction for resolving the distributed deadlock, along with the information regarding its detection, to the respective contention control processors 11 through the input sections of their decision making sections 16. As a result, the necessary processing is conducted in each of the contention control processors 11 to resolve the distributed deadlock.

As was explained above, if contention control processors 11 of this embodiment are used in a distributed database system wherein multiple database processors containing the contention control processors 11 are connected in a network, the information from output section 16a of decision making section 16 is observed by global deadlock detector 17 to detect the occurrence of a distributed deadlock, so that an effective countermeasure can be taken if a distributed deadlock occurs.

In this case, decision making section 16 can depend on the transaction IDs to decide whether the transactions that caused the contention are parent transactions generated within the same processor and to independently decide whether there is a possibility of a distributed deadlock. Therefore, if a distributed deadlock occurs, a swifter and more effective countermeasure can be taken. In addition, since decision making section 16 is provided with detection information posting section 16c for posting concurrency controller 12 with the information regarding the detection of a distributed deadlock, it can instruct, through concurrency controller 12, transaction controller 11 to cancel the queuing of the transaction forming the distributed deadlock, by means of sending instructions to concurrency controller 12 from detection information posting section 16c. Following these instructions, transaction controller 11 can take the prescribed controlling actions to swiftly resolve the distributed deadlock, Incidentally, in the above embodiment, "Whether the transactions that triggered contention are parent transactions generated within the same processor" is used as the decision making standard for decision making section 16 regarding the occurrence of a distributed deadlock, but this invention is not limited to this.

While the present invention has been described with reference to the particular illustrative embodiment, it is not to be restricted by the embodiment, but only by the appended claims. It is to be appreciated that various modifications in its configuration may be adopted without departing from the spirit of the invention or the scope of the following claims.

What is claimed is:

1. A contention control processor for controlling contention among multiple transactions in a database system, comprising:

contention detecting means for detecting when a contention between transactions within the database system occurs and when the contention is resolved;

transaction controlling means for posting said contention detecting means with contention information regarding resources to be accessed by the transactions and the state of execution of the transactions, for queuing the transaction that requested an access later in the contention until the execution of the transaction that requested an access earlier has been completed if a contention is detected by said contention detecting means, and for canceling queuing of the transaction that was queued when the resolution of the contention is detected buy said contention detecting means;

deadlock controlling means for detecting whether a deadlock has occurred within the database system if a contention is detected by said contention detecting means, and for taking controlling actions for resolving the deadlock if one has occurred; and decision making means for deciding whether a deadlock has occurred between the database system and another database system if a contention is detected by said contention detecting means, and for posting said contention detecting means with information regarding detection of the deadlock, said decision making means including means for deciding whether the transactions that caused the contention are parent transactions generated within the same database system, the detected deadlock being a distributed deadlock if they are not parent transactions generated within the same database system, wherein transaction IDs are assigned to transactions generated within this database system and are used by said decision making means to detect distributed deadlock.

2. A contention control processor in accordance with claim 1, wherein said decision making means comprises:

an output section through which the information regarding the transactions that caused contention within the same database system is sent out to a global deadlock detector on a network to which its own database system is connected; and a detection information posting section by which, if it is decided that a distributed deadlock has occurred, said contention detecting means within its own processor is posted with prescribed information for canceling the queuing of the transaction forming the distributed deadlock.

3. A contention control processor in accordance with claim 1, wherein said decision making section comprises a storage means for storing information.

4. A contention control processor in accordance with claim 1 further comprising a posting section for posting said decision making means with the information in a prescribed form regarding an occurrence or resolution of a contention detected by said contention detecting means.

5. A contention control processor in accordance with claim 1, wherein the contention control processor is interconnected least one further contention control processor in a distributed data base system which additionally includes a global deadlock detecting means which obtains the information regarding a distributed deadlock identified by said decision making means and sends out the prescribed information for resolving the deadlock to each of the contention control processors.

* * * * *